April 22, 1969     B. D. TONJES     3,439,800
AGGREGATE SIZE TESTING APPARATUS AND PROCESS Filed Jan. 9, 1967     Sheet *1* of 4

INVENTOR.
BURL D. TONJES
BY
*Hugh A. Kirk*
ATTORNEY

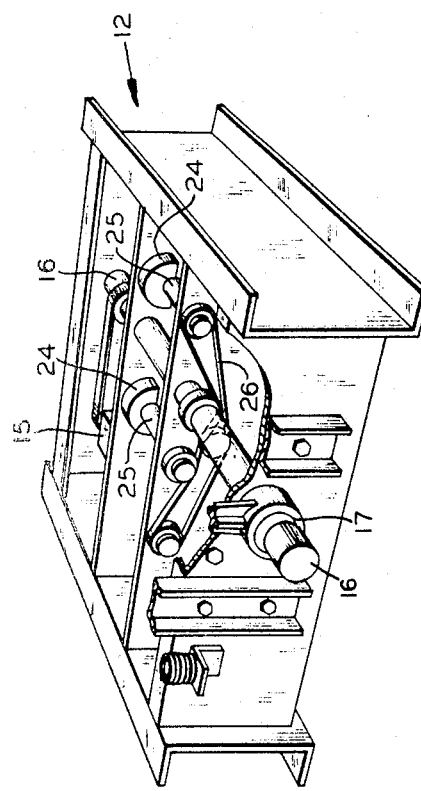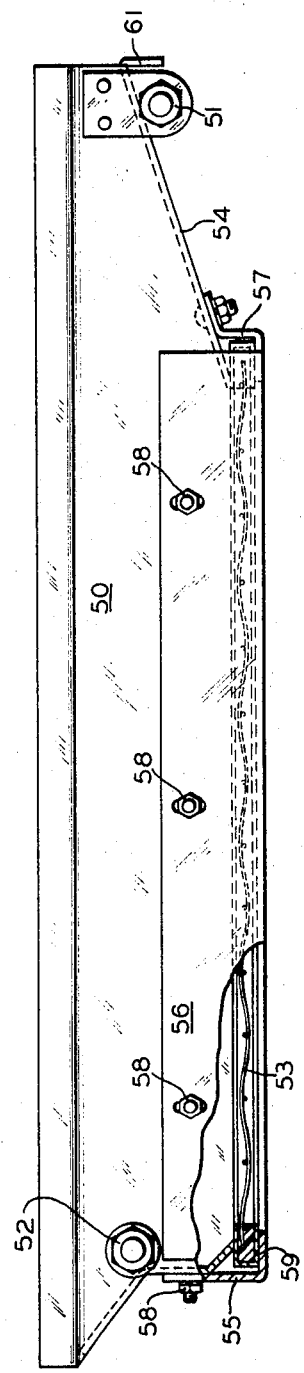

United States Patent Office 3,439,800
Patented Apr. 22, 1969

3,439,800
AGGREGATE SIZE TESTING APPARATUS AND
PROCESS
Burl D. Tonjes, Malinta, Ohio, assignor to Gilson Screen
Company, Malinta, Ohio, a partnership
Filed Jan. 9, 1967, Ser. No. 608,011
Int. Cl. B07b 1/28
U.S. Cl. 209—3                                    15 Claims

ABSTRACT OF THE DISCLOSURE

This invention relates to an apparatus and process for rapidly ascertaining the proportionate amounts of various sized particles in an aggregate including separate and successive coarse and fine particle size plural screen tray vibratory separators, and separate splitters for each separator so that fine aggregates can be split more and only fed to the fine particle size separator. All the trays of each separator are individually pivotally mounted so that they may be tilted simultaneously in parallel while being vibrated for dumping into separate parallel corresponding collection chutes for separate selective discharge and analysis such as by weighing. The base of the separator is provided with a pair of oppositely rotating parallel shafts having eccentric weights angularly adjustable thereon to counteract the vertical vibrations of the separator and to counteract each other's horizontal vibrations.

BACKGROUND OF INVENTION

In prior art testing devices, a batch sample of aggregate was manually dumped onto the top screen of a plural screen vibratory separator and then after size separation was completed the separate portions of aggregate were manually removed individually. The manual handling of the material was time consuming, and it reduced the time that the separator was productively available. Manual handling was still a further problem when the aggregate comprised large size crushed stone having a particle size up to 6" because the sample batch may weigh as much as 500 pounds in order to be a characteristic sample of the aggregate mass.

SUMMARY OF INVENTION

Generally speaking, the apparatus and process involve a splitter for receiving an input batch of aggregate material and dividing it into fractional parts, each characteristic of the whole mass. One or more of these fractional portions may be selected and evenly supplied to the top screen of one or more plural screen vibratory separators for size separation. The separators have a stack of pivotally mounted horizontally disposed screen pans with side walls for containing the oversized aggregate until complete size separation is accomplished. A means such as a fluid operated piston, is provided for tilting all of the screen pans in parallel from the horizontal position into a discharging position, while the screen pans are still being vibrated, so that the oversized contents remaining in each screen pan may be separately dumped into a compartmentalized receptacle or chute for releasably holding the separated aggregate. Each of the separate portions of aggregate may be separately released from the receptacle for analysis, such as by a computer type weighing device. The base of the vibratory screening device may also contain a vibration counterbalance such as a pair of complementary and vibration opposing rotating eccentric weights, to reduce the problems normally inherent in the installation and mounting of vibratory separators.

A batch-type tester made in accordance with this invention has a productive capacity approaching that of a continuous-type separator, in that the transfer of material to and from the separator is accomplished automatically and quickly.

The apparatus and process disclosed herein are well suited for the testing of either continuous or batch-type movements of crushed stone, gravel, and the like aggregate to determine the proportionate amount of the variously sized particles in the aggregate.

It is a primary object of this invention to produce a size testing apparatus and process for quickly, accurately and automatically determining the proportionate amounts of various particle sizes in a large mass of aggregate by selecting, separating and separately testing the separated portions of a characteristic sample portion of the aggregate.

It is another object of this invention to produce a plural screen size vibratory separator which quickly and separately discharges the masses of oversized particles contained on each screen during its vibratory operation.

It is still another object of this invention to produce such a vibratory tester which is relatively free from objectionable vibrations of its base and/or mounting.

BRIEF DESCRIPTION OF DRAWINGS

The above mentioned and other features and objects of this invention and the manner of attaining them will become more apparent and the invention itself will be understood best by reference to the following description of an embodiment of this invention taken in conjunction with the accompanying drawings, wherein:

FIG. 2 is an enlarged perspcetive view of the stationary base of the size-separator of FIG. 1, with parts broken away to show the vibration counterbalancing means and its drive mechanism;

FIG. 3 is an enlarged side view with parts broken away showing the details of one of the pivotally mounted screen bottomed pans and the edge bound screen member of the size-separator in FIG. 1;

DETAIL DESCRIPTION OF A PREFERRED EMBODIMENT

The base

Figure 1:
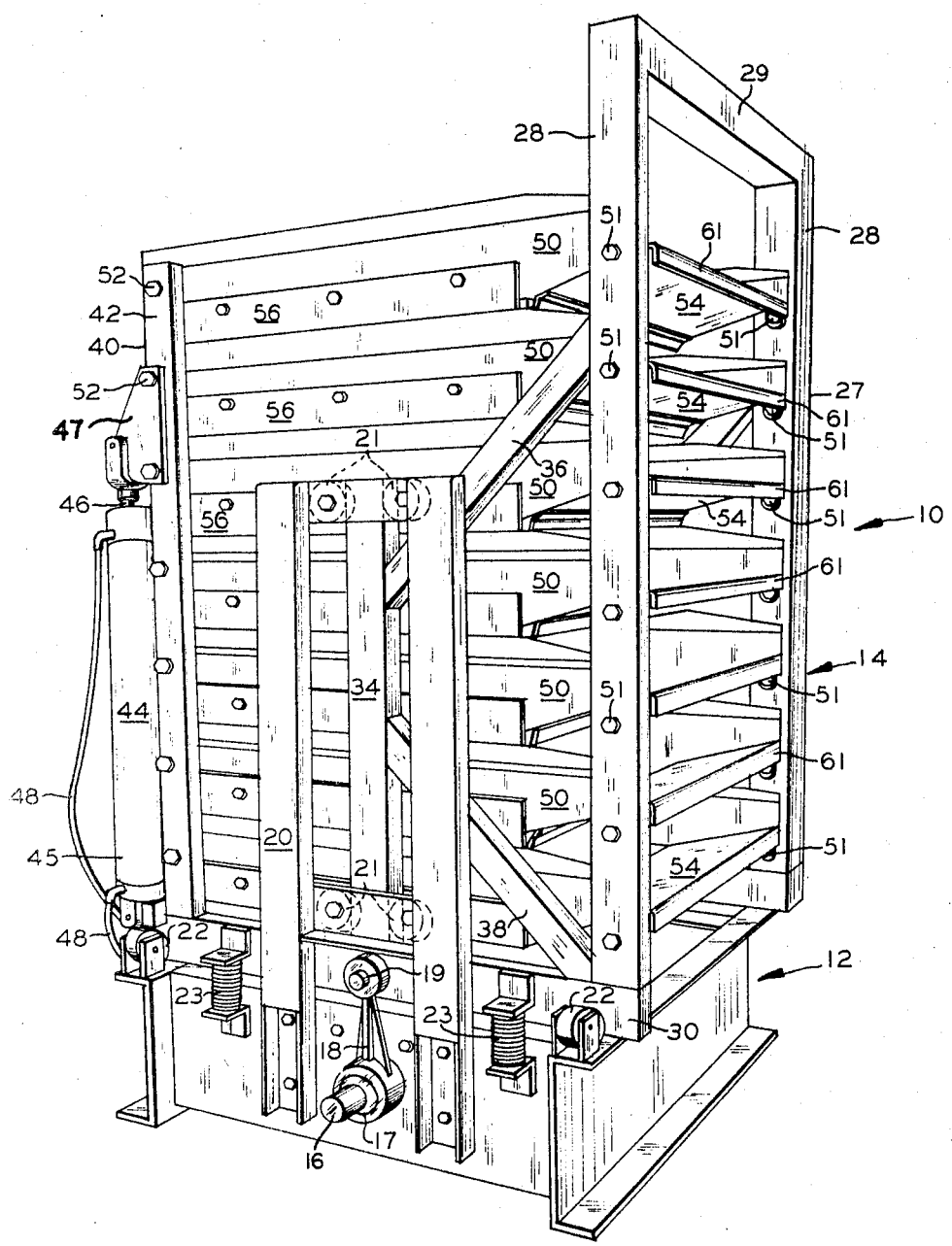
FIG. 1 is a perspective side and front view of an embodiment of the vibratory size-separator of this invention.

Referring to the drawings, FIG. 1 shows a vibratory size-separator 10 having a stationary rectangular base or mounting frame 12 and vibratory screen assembly 14 movably supported thereon. A motor means such as an electric motor 15 (see FIG. 2) may be provided to rotate a drive shaft 16 having an eccentric 17 at each end and journaled in the base 12 directly beneath the center of gravity of the vibratory assembly 14. A connecting rod 18 may be pivotally attached to each eccentric 17 and to a pivot 19 on the vibratory assembly 14 above the eccentrics 17. The base frame 12 may have upright guide assemblies 20 mounted centrally and on opposite sides thereof for carrying pairs of guide rollers 21 to engage and position the vibratory assembly 14 and limit its movement preferably to vertical reciprocations. Complementary guide rollers 22, with their rotational axes perpendicular to the first mentioned guide rollers 21, may be provided adjacent the four corners of the base frame 12 to engage the lower edges of vibratory assembly 14 and prevent it from twisting. Stabilizing springs 23 may also be provided between the base frame 12 and the vibratory assembly adjacent the base frame corners.

A vibration counterbalancer may be provided in the base frame 12 to overcome the inertia of the vibratory screen assembly 14 (see FIG. 2). The counter balance may comprise two equal-weight rotary eccentric masses 24 which may be rotated in opposite direction on parallel shafts 25 in a horizontal plane, which shafts are driven by a belt, gear or chain drive 26 connected to the central drive shaft 16. These eccentric weights 24 are angularly adjustable or phased on their shafts 25 so that their resultant forces in the horizontal plane cancel each other out, and their resultant forces in a vertical direction diametrically oppose the vertical inertia of the screen assembly 14. That is, when the assembly 14 is up the centers of mass of the weights 24 are down or below their shafts 25, and when the assembly 14 is down, the centers of mass of the weights 24 are up or above their shafts 25.

The vibratory assembly

The vibratory screen assembly 14 may comprise a first or base L-shaped frame 27 comprising two parallelly spaced vertical support members 28 rigidly connected together at their tops by a lateral bar 29. This L-shaped frame 27 is located between the vertical guide assemblies 20 with the horizontal leg 30 on each vertical member 28 adjacent the base 12. A vertical guide post 34, fixed at the center of each horizontal leg 30 is steadied by two angular struts 36 and 38 extending from the vertical leg 28 to the guide post 34. The vertical guide post 34 is embraced by the pairs of guide rollers 21 to provide for vertical movement only.

A second vibratory frame member 40, which is movable with respect to the first L-shaped frame member 27, may comprise a rectangular frame with two vertical legs 42 supported atop the free end of the horizontal legs 30 of the first frame member 27. A fluid operated tilting mechanism or means 44 may be provided for vertically raising the second member 40 with respect to the first member 27. This means 44 may comprise a pair of hydraulic cylinders 45 pivoted to the free ends of the members 30, and piston means 46 therein pivoted to brackets 47 near the tops of the vertical members 42. These cylinders may be connected by flexible hoses 48 to a source of fluid pressure which may be either outside the separator 10 or provided by a pump (not shown) mounted in the base 12 and driven by the motor 15 or by another motor.

Figure 4:
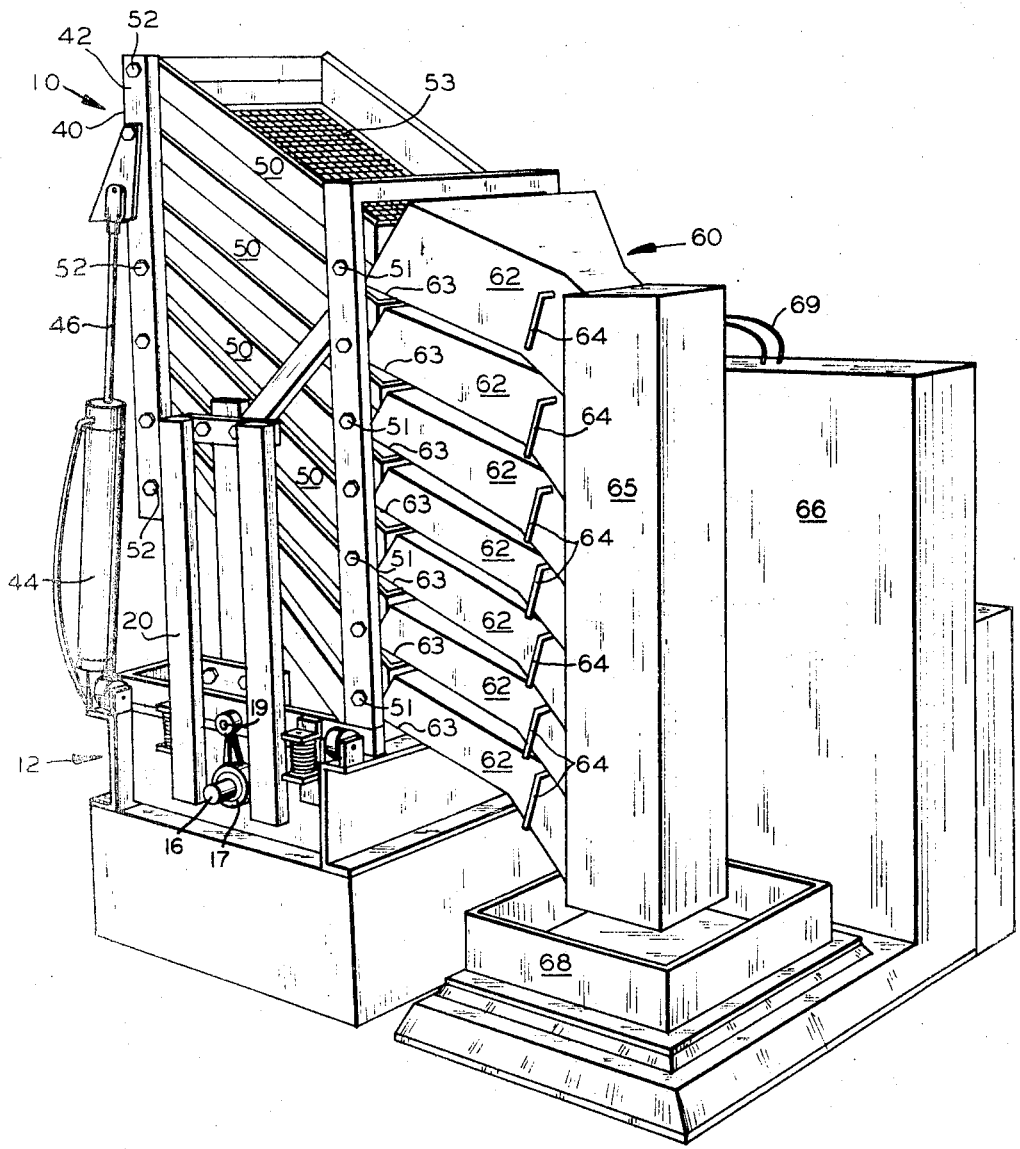
FIG. 4 is a perspective view of the aggregate size testing apparatus similar to FIG. 1, but with its screen pans tilted into their discharging position, and including a compartmentalized collector or chutes of these pans and a weighing device onto which these chutes may be selectively discharged.

Screen bottomed trays or pans 50 (see also FIG. 3) may be attached at their ends on their opposite sides by pivot means 51 and 52, such as trunnions and bushings, to the vertical members 42 and 28 of frames 40 and 27, respectively. These trays 50 are preferably mounted so that their bottom screens 53 are normally in a horizontal position during their vertical reciprocations in the size separation process. After the size separation is completed, screen pans 50 may be tilted from the horizontal position by the fluid operated means 44 into a discharge position (see FIG. 4) in which the oversized particles on each screen pan are dumped or cleared from the separator. To facilitate this dumping, the wall 54 of each pan may be inclined at its discharge end or side and the vibration of the screen assembly 14 may be and usually is continued during the dumping process since the tilting mechanism 44 is mounted on the vibratory assembly 14.

The construction of the screen pans or trays 50 is such that the screens 53 are removable as shown in FIG. 3 where the screens 53 are clamped to the open bottom of the pan by angle brackets 55, 56 and 57 held by threaded fasteners 58. To insure a more accurate size separation, the screens 53 may be edge bound with plastic 59 or the like so that all fractional apertures at the edge of the screen are covered by the plastic binding and only full sized apertures are presented to the input particles of aggregate (see FIG. 11 of Tonjes et al. U.S. Patent No. 3,098,037).

The collector chutes

Figure 5:
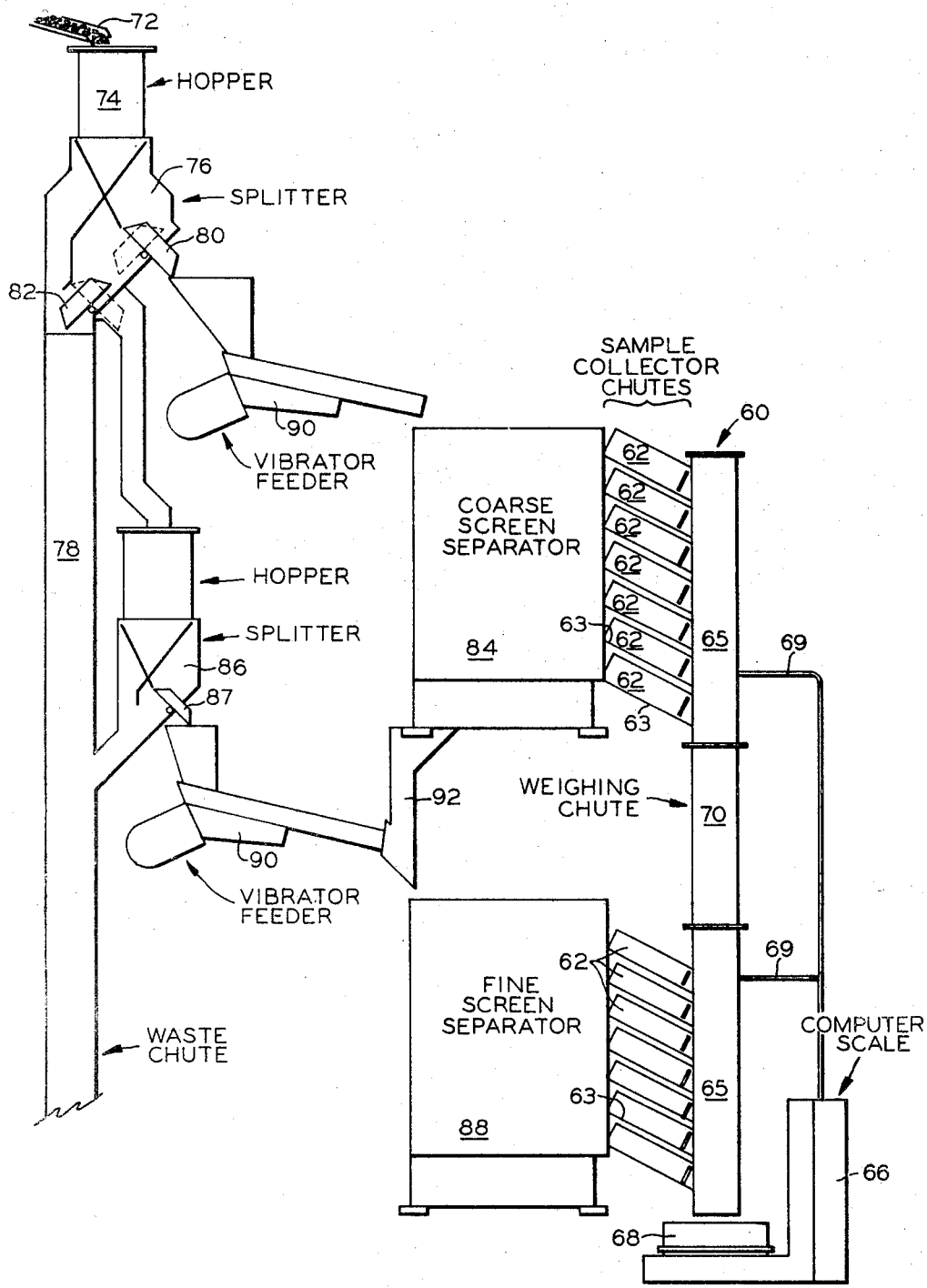
FIG. 5 is a schematic flow diagram of an aggregate size tester embodying a plurality of the separators shown in FIG. 1 being fed by splitters and distribution ducts, and compartmentalized receptacles adjacent each separator for selective discharge to a common automatic weighing device.

A compartmentalized receptacle or collector 60 (see FIGS. 4 and 5) may be provided adjacent the discharge edges 61 (see FIGS. 1 and 3) of the screen pan walls 54 to receive separately the oversized contents of all screen pans as they are dumped. The collector 60 may comprise a tier of inclined compartments, troughs, or chutes 62, each having an upper open end for receiving a size sorted portion of aggregate, and a downwardly inclined bottom 63 so that the aggregate will gravitate towards a gate means 64 at the lower end of each inclined compartment. The lower end of each inclined compartment 62 may terminate in a common vertical passageway in housing 65 leading to an analyzing device such as a computerized weighing scale 66 which calculates the weight of each size graded portion of aggregate from the cumulative increments of weight as the contents of each compartment 62 are released onto the weighing pan 68 by successively opening the gate means 64 which openings may be controlled by the computer 66 via cables 69. When more than one collector 60 is used, such as one above the other as shown in FIG. 5, their vertical passages in housing 65 may be joined together by a duct 70 so both collectors discharge onto one scale 66 and one weighting pan 68.

The process

The feeder apparatus (see FIG. 5) for delivering the sample aggregate to one or more size separators may include a conveyor 72 for feeding a clam bottomed receiver 74 to accumulate a batch of aggregate and then to discharge it evenly over the centerline of a splitter 76. This splitter 76 may be a four part splitter in which the input batch of aggregate is divided into four equal parts, two of which are directed to the waste chute 78, while one or both of the other two fractional portions are directed to either of the dual gate chute means 80 or 82 and thence either to a coarse plural screen separator 84, or if the aggregate comprises all small size particles, to a secondary splitter 86 which further divides the fractional portion received for delivery of only a part thereof in like manner via a gate means 87 to a fine plural screen separator 88. A downwardly inclined vibrator feeder 90 may be interposed between the gate chute means 80 and 87 of each splitter 76 and 86 and its corresponding plural screen separator 10 or 84 and 88, respectively, so as to provide an even flow of aggregate into the top tray of each separator 10 and thereby prevent overcrowding or jamming of their top screens.

The coarse screen separator 84 may have a transfer chute 92 leading from its lower section to the top screen of the fine screen separator 88 so that the residue which passes the smallest and lowermost screen of the coarse screen separator 84 may be further size separated in the fine screen separator 88.

Thus the size separation process may comprise the steps of conveying 72 a sample batch of aggregate to a splitter 76 where it is divided into fractional portions, one or more of which is selectively dispensed 90 to a vibratory size separator 84 and/or 88 for size separation. After the size separation is completed, the separated portions of aggregate are dumped into a compartmentalized collector 60 where they are releasably held and then separately selectively or successively transferred 65 to a weighing device 66 for analysis.

While there is described above the principles of this invention in connection with specific apparatus, it is to be clearly understood that this description is made only by way of example and not as limitation to the scope of this invention.

What is claimed is:
1. An apparatus (10) for separating particles of aggregate material according ot size comprising:
  (A) a base frame (12),
  (B) a vibratory frame (14) mounted thereon having parallel vertical relatively movable support members (28, 40),
  (C) a plurality of horizontally disposed screen bottomed pans (50), arranged one above the other, each separately pivotally mounted (51, 52) adjacent opposite sides in said vertical support members,
  (D) means (15, 16, 17, 18) for vibrating said vibratory frame, and
  (E) means (44) for tilting said pivotally mounted pans simultaneously from said horizontal position.

2. An apparatus according to claim 1 wherein said means for tilting is a fluid cylinder (45) and piston (46) means between said members.

3. An apparatus according to claim 1 further comprising a counterbalance (24) having oppositely rotatable eccentric masses journaled (25) on said base frame and phased such that their resultant lines of force counterbalance the inertia of the vibratory frame.

4. An apparatus according to claim 1 including a collection chute (60) having compartments (62) which cooperate with each of said screen pans for separately and releasably holding the particles discharged from each screen pan after said pans are tilted by said tilting means.

5. An apparatus according to claim 4 wherein said compartments have an inlet and an outlet end, a gate means (64) at said outlet end, and a passageway (65) common to the outlet ends.

6. An apparatus according to claim 1 wherein said means for vibrating comprises an eccentric means (17) rotatable on a shaft (16) journalled in said base frame and to a connecting rod (18) pivotally (19) connected between said eccentric means and said vibratory frame.

7. An apparatus (10) for separating the particles of an aggregate material comprising:
  (A) a base frame (12),
  (B) a vibratory frame (14) mounted for vertical reciprocation thereon, and said vibratory frame having a first supporting member (27 or 40) relatively movable with respect to a second supporting member (40 or 27),
  (C) a plurality of horizontally disposed screen pans (50) arranged one above the other, each having spaced apart pivots (51, 52) for pivotally mounting said pans on each of said supporting members,
  (D) fluid cylinder (45) and piston (46) means (44) connected between said supporting members for moving said first supporting member relative to said second supporting member to tilt said pivotally mounted pans into a discharging position,
  (E) means (15, 16, 17, 18, 19) for vibrating said vibratory frame including:
    (1) a rotatable drive shaft (16) journaled on said base frame.
    (2) an eccentric (17) on said drive shaft, and
    (3) a connecting rod (18) pivotally connected between said eccentric and said vibratory frame, and
  (F) a collection chute (60) having compartments (62) which cooperate with each of said screen pans for releasably holding the particles remaining on each screen pan after size separation is completed.

8. An apparatus according to claim 7 further comprising a counterbalance (24) having oppositely rotatable eccentric masses journaled (25) on said base frame and phased such that their resutlant lines of force counterbalance the inertia of the vibratory frame.

9. An apparatus according to claim 7 further comprising a splitter means (76 or 86) above the uppermost screen pan for fractionally dividing an entering mass of said aggregate material, and means (90) for delivering one of said fractions to said uppermost screen pan.

10. An apparatus according to claim 9 wherein said delivery means includes a vibratory feeder between said splitter means and said uppermost screen pan for providing an even flow of said material to said uppermost screen pan.

11. An apparatus (10) for separating particles of aggregate material according to size comprising:
  (A) a base frame (12),
  (B) a vibratory frame (14) mounted thereon,
  (C) a plurality of horizontally disposed screen bottomed pans (50), arranged one above the other, pivotally mounted (51, 52) on said vibratory frame,
  (D) means (15, 16, 17, 18) for vibrating said vibratory frame, and
  (E) counterbalance means (24) having oppositely rotatable eccentric masses mounted on parallel shafts journalled (25) in said base frame separate from and and driven by said vibrating means, and phased such that their resultant lines of force counterbalance the inertia of the vibratory frame.

12. An apparatus according to claim 11 including means (44) for tilting said pivotally mounted pans from said horizontal position.

13. An apparatus for size separating the particles of an aggregate material comprising:
  (A) separate coarse particle size and fine particle size vibratory screening means (84 and 88) vertically spaced from each other, each having a plurality of horizontally disposed screen pans (50) arranged one above the other,
  (B) separate first and second splitter means (76 and 86), said first splitter means being disposed above said coarse screening means for fractionally dividing an entering mass of said material, said second splitter means being disposed beneath said first splitter means and above said fine screening means,
  (C) means (80) for delivering one of said fractions from said first splitter means to said coarse screening means,
  (D) means (92) for delivering the finer particles from said coarse screening means to said fine screening means,
  (E) means (82) for delivering said one of said fractions from said first splitter means to said second splitter means, and
  (F) means (87), for delivering a fraction of said one fraction entering said second splitter means to said fine screening means, whereby one of said fractions from said first splitter means may be further divided when only being delivered to said fine screening means.

14. An apparatus according to claim 13 including means (44) for tilting said screen pans for discharging the particles remaining in each pan after size separation of said aggregate, and including receptacle means (60, 62) adjacent said pans for receiving and separating and releasably holding said particles of each pan.

15. A continuous sampler for size testing aggregates comprising:
  (A) a continuous feeder (72) of said aggregate to said sampler,
  (B) a first splitter (76) for splitting said fed aggregate into fractional portions,
  (C) a first distributor (90) for a split portion of said aggregate,
  (D) a first plural screen separator (84) fed by said first distributor for separating various larger sizes of said split portion of said aggregate,
  (E) a second plural screen separator (88) for separating various smaller sizes of aggregate,
  (F) duct means (92) for delivering the smallest sizes from said first separator to said second separator, (G) a second splitter (86) for a split portion of said aggregate from said first splitter when said aggregate primarily contains said smaller sizes, (H) gate means (80, 82) between said first splitter and said first distributor for directing said larger size aggregate portion from said first splitter to said first distributor and said smaller size aggregate portion to said second splitter, (I) a second distributor (90) for a split portion of said aggregate from said second splitter for feeding said second separator, (J) gate means (87) between said second splitter and said second distributor for directing a fraction of said smaller aggregate portion to said second separator, (K) means (44) for discharging the contents of each screen of each separator, and (L) means (60, 62) for separately retaining said discharged contents of each screen for separate successive analysis.

References Cited

UNITED STATES PATENTS

| | | | |
|---|---|---|---|
| 2,396,954 | 3/1946 | Kranz | 209—260 |
| 2,499,171 | 2/1950 | Sinden | 198—220 |
| 2,782,926 | 2/1957 | Saxe | 209—237 |
| 2,959,285 | 11/1960 | Tonjes | 209—319 |
| 3,098,037 | 7/1963 | Tonjes | 209—260 |

FRANK W. LUTTER, *Primary Examiner.*

U.S. Cl. X.R.

209—237, 241, 239, 260, 314, 348, 365, 405, 413; 74—26, 589; 73—432

U.S. DEPARTMENT OF COMMERCE
PATENT OFFICE
Washington, D.C. 20231

UNITED STATES PATENT OFFICE
CERTIFICATE OF CORRECTION

Patent No. 3,439,800 April 22, 1969

Burl D. Tonjes

It is certified that error appears in the above identified patent and that said Letters Patent are hereby corrected as shown below:

Column 6, line 58, "separating" should read -- separately --.

Signed and sealed this 14th day of April 1970.

(SEAL)
Attest:

Edward M. Fletcher, Jr.

Attesting Officer

WILLIAM E. SCHUYLER, JR.

Commissioner of Patents